May 18, 1943. M. OLLEY ET AL 2,319,430
SUSPENSION SYSTEM
Filed July 3, 1940

Inventors
Maurice Olley &
George F. Gibson
Blackmore, Spencer & Flint
Attorneys

Patented May 18, 1943

2,319,430

UNITED STATES PATENT OFFICE 2,319,430

SUSPENSION SYSTEM

Maurice Olley, Detroit, Mich., and George F. Gibson, Luton, England, assignors to General Motors Corporation, Detroit, Mich., a corporation of Delaware Application July 3, 1940, Serial No. 343,807
In Great Britain July 3, 1939

14 Claims. (Cl. 267—66)

This invention relates to vehicle suspension systems, and particularly to the manner of controlling movements of the axle relatively to the body of the vehicle.

The object of the invention is a linkage controlling lateral and longitudinal movements of an axle relative to the vehicle body.

A more specific object of the invention is a linkage controlling lateral and longitudinal movements of a Hotchkiss drive rear axle with leaf spring suspension.

The above and other objects of the invention will be apparent as the description proceeds.

According to the invention, the linkage comprises a pair of links pivoted respectively to the axle and the body of the vehicle, the links being substantially in the plane of the springs and forwardly divergent from the center of the axle.

One exemplary embodiment of the invention is shown in the accompanying drawing in which.

Figure 1:
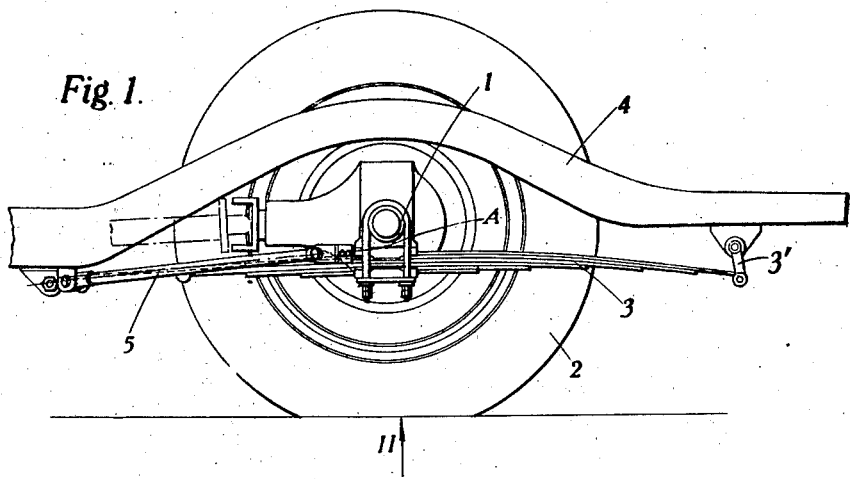
Figure 1 is a side elevation of one half of a rear suspension, with one rear wheel removed.
Figure 2:
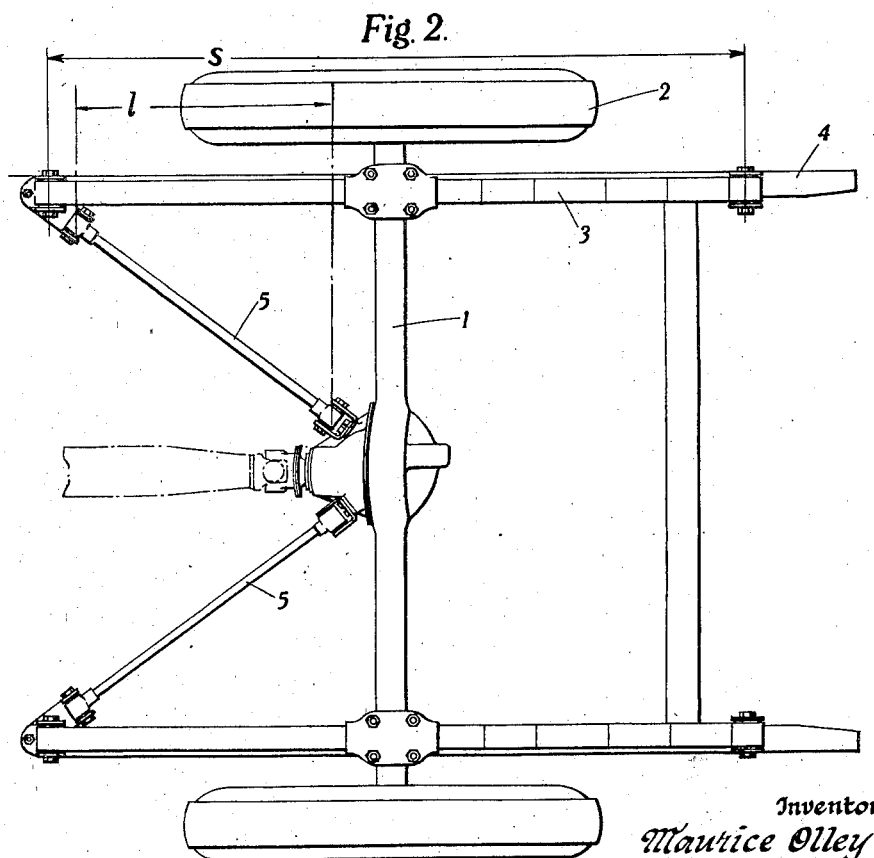
Figure 2 is an underside view of the same rear suspension.

In the construction shown in the drawing, the axle 1 carrying the wheels 2 is attached to the leaf springs 3 which have their forward ends pivotally connected to the longitudinal chassis members 4 and their rearward ends shackled thereto by shackles 3'. Pivotally attached to the axle 1 and the chassis members 4 are links 5. The links 5 are pivoted at their rear ends to the differential casing on the axle 1 and at their front ends to the longitudinal chassis members 4, adjacent the front pivots of the leaf springs 3. The links 5 lie substantially in the plane of the springs and are normally slightly inclined downwardly in the forward direction, as is clear from Figure 1. In the preferred construction the length (*l*) of the links 5 when projected onto a vertical longitudinal plane are approximately ⅜ of the total length (*s*) of the springs 3.

The links diverge from one another in the forward direction, and the arrangement is such that the point of intersection (A) of the links if produced rearwardly, lies approximately in the transverse vertical plane containing the axle axis.

Preferably the pivots of the links are provided with rubber bushings. Alternatively ball and socket joints can be used.

In vehicles which have no chassis frame, the links are connected at their front ends to a part of the body. Obviously the connection can be made to any suitable portion of the suspended part of the vehicle.

The links 5 control movement of the axle relatively to the vehicle body both laterally and longitudinally and relieve the springs of this duty.

We claim:

1. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from the axle to the vehicle frame.

2. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from the axle to the vehicle frame and lying substantially in the plane of the springs.

3. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from points towards the middle of the axle to the vehicle frame at points adjacent the pivotal connections of the springs to the frame.

4. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent and normally slightly inclined downwardly from the axle to the vehicle frame.

5. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from the axle to the vehicle frame and having a projected length in a vertical longitudinal plane, three-eighths the total length of the springs.

6. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from the axle to the vehicle frame, and their point of intersection produced lying approximately in the transverse vertical plane containing the axis of the axle.

7. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to the axle and the vehicle frame; said links being forwardly divergent from the axle to the vehicle frame and lying substantially in the plane of the springs, the links being connected to the vehicle frame at points adjacent the pivotal connections of the springs to the frame, and to the axle towards its middle.

8. In a motor vehicle, in combination, a frame, a rigid axle carrying road wheels on opposite sides of the vehicle, longitudinally disposed leaf springs secured intermediate of their ends to opposite ends of the axle and having their forward ends pivotally connected to the vehicle frame and their rearward ends shackled to the vehicle frame, and a pair of links between the axle and the vehicle frame with their opposite ends pivotally connected to the axle and the vehicle frame respectively; the pivotal connections of said links to the axle being at points towards the middle thereof but spaced transversely of the vehicle, and the pivotal connections of said links to the frame being adjacent the pivotal connections of the springs to the frame, said links being forwardly divergent and said links and springs lying substantially in a common plane from their connections to the axle to their pivotal connections to the vehicle frame.

9. The combination according to claim 8 in which said links and springs are normally slightly inclined downwardly and forwardly from their connections to the axle to their pivotal connections to the vehicle frame.

10. The combination according to claim 8 in which the point of intersection of the links produced lies approximately in a transverse vertical plane containing the axis of the axle.

11. The combination according to claim 8 in which the axle is secured to the springs midway of their length and the length of the links projected in a vertical longitudinal plane is approximately three-eighths the total length of the springs projected in the same plane.

12. In a motor vehicle, in combination, a frame, a rigid axle carrying road wheels on opposite sides of the vehicle, longitudinally disposed leaf springs secured midway of their length to opposite ends of the axle and having their forward ends pivotally connected to the vehicle frame and their rearward ends shackled to the vehicle frame, and a pair of links between the axle and the vehicle frame, with their opposite ends pivotally connected to the axle and the vehicle frame respectively; the pivotal connections of said links to the axle being at points toward the middle thereof but spaced transversely of the vehicle, the pivotal connections of said links to the frame being adjacent the pivotal connections of the springs to the frame, and the point of intersection of the links produced lying approximately in a transverse vertical plane containing the axis of the axle; said links being forwardly divergent and said links and springs being normally slightly inclined downwardly and forwardly from their connections to the axle to their pivotal connections to the vehicle frame and lying substantially in a common plane thus inclined; the length of the links projected in a vertical longitudinal plane being approximately three-eighths the total length of the springs projected in the same plane.

13. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links having their opposite ends respectively pivotally connected to substantially horizontal pivot pins on the axle and the vehicle frame; said links being forwardly divergent from the axle to the vehicle frame, and their pivot pins being normal to their respective longitudinal axes.

14. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, and a pair of links lying substantially in the plane of the springs having their opposite ends respectively pivotally connected to substantially horizontal pivot pins on the axle and the vehicle frame; said links being forwardly divergent from the axle to the vehicle frame and their pivot pins being normal to their respective longitudinal axes.

MAURICE OLLEY.
G. F. GIBSON.